April 8, 1930.                M. E. CHENEY                  1,753,402
ELECTRIC MEASURING INSTRUMENT
Original Filed Oct. 20, 1927
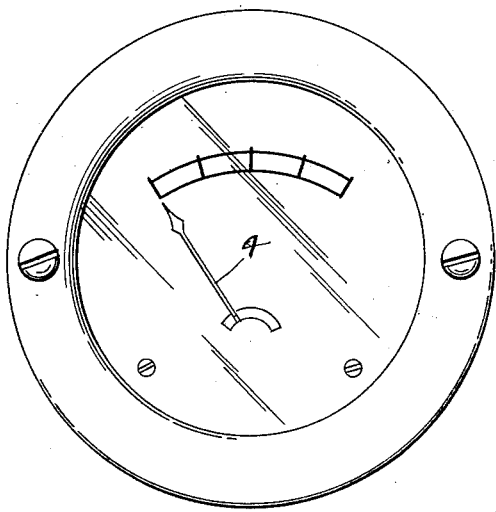
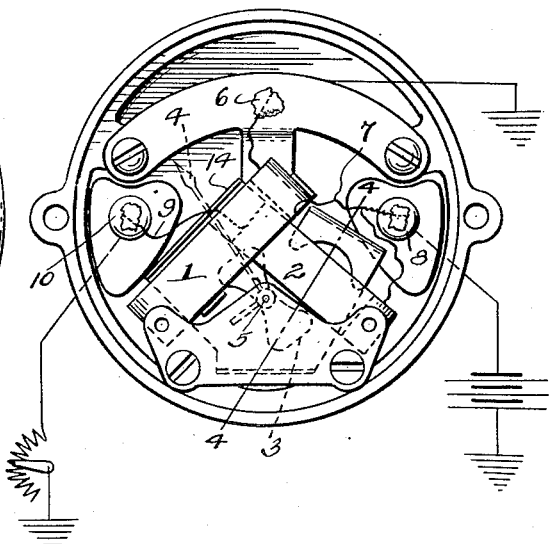
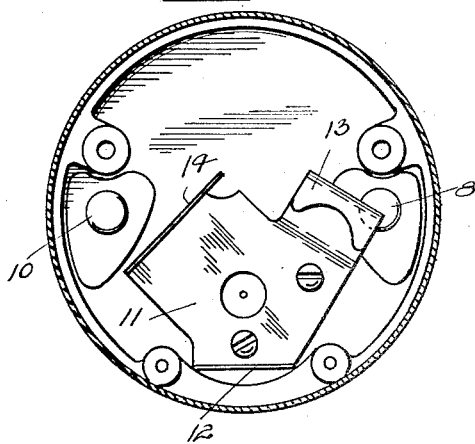
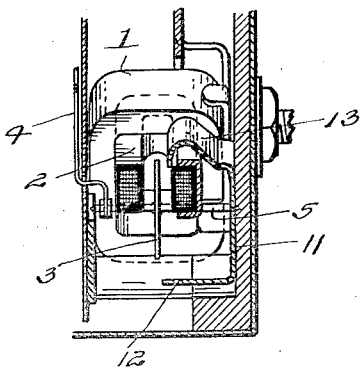
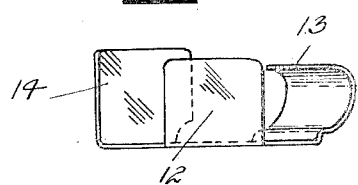
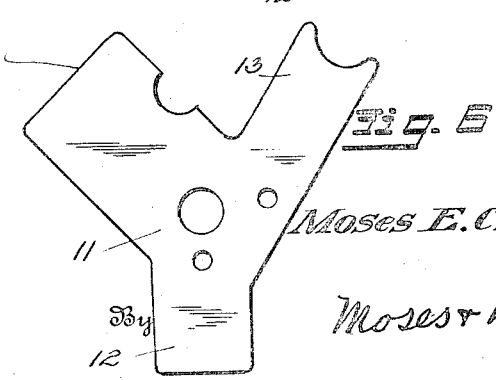
Inventor
Moses E. Cheney
By Moses & Nolte
Attorneys Patented Apr. 8, 1930

1,753,402

UNITED STATES PATENT OFFICE

MOSES E. CHENEY, OF BAYPORT, NEW YORK, ASSIGNOR, BY MESNE ASSIGNMENTS, TO MOTO METER GAUGE & EQUIPMENT CORPORATION, OF LONG ISLAND CITY, NEW YORK, A CORPORATION OF DELAWARE

ELECTRIC MEASURING INSTRUMENT

Application filed October 20, 1927, Serial No. 227,399. Renewed December 7, 1929.

This invention relates to an improvement in an indicating instrument, such as a galvanometer of the Kelvin type wherein an armature is arranged to oscillate in a magnetic field, and is particularly adapted to the type of electrical liquid level gauge employing a plurality of solenoids or coils, such gauges being now in common use on motor cars.

In a general way, the improvement consists in a deflecting and calibrating device particularly adapted to the type of galvanometer employing two coils arranged in angular relation one to the other and connected up to the source of current. In order to dampen the instrument, it is desirable to place near said armature a device having a sufficient mass of magnetic material, and in this improved device the magnetic material is so formed and shaped as to greatly reduce the reluctance of the magnetic paths permitting thereby a much stronger or more concentrated resultant field which not only controls more positively the position of the armature, but also tends to greatly reduce the oscillations of the armature.

Referring to the drawings, Fig. 1 is a plan view of the top of the instrument; Fig. 2 is a plan view, the top plate and glass being removed; Fig. 3 is a similar view, the coils and armature being removed; Fig. 4 is a cross section on the line 4—4 of Fig. 2 with dial added; Figs. 5 and 6 are detail views of the deflector plate.

In the type of instrument illustrated herein, the coils 1 and 2 are in angular relation and one end of the coil 2 extends within the air gap formed in coil 1 and the coils are thereby partially nested so as to form a desirable magnetic cross field common to said coils. It is common practice to connect one of two coils in series with a rheostat on a liquid container or tank and the other with the battery and ground in such manner that an armature will respond to the variations of resistance in the rheostat and thereby cause a pointer to indicate the amount of liquid in the tank.

Coil 1 is grounded at the point 6 and it is connected to the battery through branch line 7 extending to terminal 8 and coil 2 is connected through this branch line 7 to said battery and by line 9 to the terminal 10 which is in turn connected to the rheostat. The armature marked 3 and the pointer 4 are mounted on the shaft 5 (Fig. 2) in any usual and ordinary way.

In this type of instrument the magnetic cross field formed by the two coils and its effect on the armature placed within such cross field is such that it is desirable to reduce the oscillations of said armature and the pointer connected therewith. Accordingly it is my purpose to provide a flux distributor which preferably takes the form of Plate 11, Fig. 6, such plate having projecting arms 12, 13 and 14. The three arms are thereafter bent into the vertical position shown in Fig. 5 and the two coils are substantially enclosed by this structure, the arm 13 being bent into a curved position and its projecting end extending within the air gap of coil 2 and slightly overlapping the edge of said coil (Figs. 2 and 4). The arm 14 forms in effect an abutment for the outer part of coil 1 (Fig. 2) while arm 12 will lie near the outer edge of the cross field or space wherein the armature is placed. The arm 13 can readily be manipulated into different shapes and positions such that the proper calibration can be made of the instrument. As shown in Figs. 2 and 3 the armature 3 is positioned in the open or air space between the coils and this armature is shown to be of a length that it tends to bridge the gap between a coil and the tail piece 12 thereby strengthening the field and making the instrument more sensitive to changes in the voltage of the coils.

It must be apparent that without projection 12 of the deflector the lines of force from the two coils will extend in different directions and would in effect be concentrated at the ends of the projecting arms 13 and 14, while there would necessarily be caused to exist a much weaker field between these two points due to the poor magnetic path there obtaining. This tends to give a non-uniform scale and difficulty in calibrating. By adding the projection 12 however, these difficulties are overcome. The field is smoothed out as well as strengthened and the instrument is readily calibrated.

Subject matter shown herein and not claimed is claimed in co-pending applications.

Having described the invention, I claim as follows:

1. In an electrical measuring instrument the combination of two coils placed in angular relation one to the other, connections to a source of current for causing a cross magnetic field between said coils, an armature mounted within said cross field, a flux distributor comprising a plate of magnetic material having arms capable of being bent into position to lie adjacent the vertical planes of the coils, one of said arms being curved at its outer end to form means for calibrating the instrument.

2. In an electrical measuring instrument the combination of two coils placed in angular relation one to the other, connections to a source of current for causing a cross magnetic field between said coils, an armature mounted within said cross field, a flux distributor comprising a plate of magnetic material having arms capable of being bent into position to lie adjacent the vertical planes of the coils, one of said arms being curved at its outer end to form means for calibrating the instrument, the projecting end of said curved arm partially encircling a part of one of said coils.

3. In an instrument of the character described the combination of a plurality of solenoids arranged in angular relation, one to the other, with a magnetic plate formed to contain and surround said coils while held in their angular relation, end portions of said plate being turned up, said upturned parts being placed adjacent vertical planes of the coils to interrupt the outward flow of the flux and confine it within the field between the coils.

4. In a device of the character described, the combination of two solenoids partially nested, one being placed at an angle to the other, a magnetic plate having projecting parts positioned to conform to the solenoids, end portions of said plate being turned up, the solenoids being contained within said plate and the upturned end portions being placed adjacent portions of said solenoids to interrupt the flow of flux and cause it to be concentrated within the space occupied by said coils.

5. In an instrument of the character specified the combination of current coils arranged at an angle one to the other forming an open field between them with an armature positioned in said open field and a magnetic member adjacent said coils and armature and partially enveloping said coils, said magnetic member being arranged to form with said armature a path for the flux through said armature from each of said coils, said path substantially encircling said coils and open field.

6. In an instrument of the character specified the combination of current coils arranged at an angle to form an open field with an armature positioned in said field and a magnetic member partially encircling said coils and open field, the armature being oscillated between the ends of said magnetic member whereby the space between said ends will be periodically bridged during the oscillation of said armature forming a substantially closed flux path around the coils.

7. A flux distributing plate for use in an electrical measuring instrument composed of magnetizable material having a plurality of bendable arms, one of said arms having a cut-out portion at its outer end forming bendable tips and said arm being bent into upright position to form an abutment for said instrument.

8. In an electrical measuring instrument the combination of two coils placed in angular relation one to the other, connections to a source of current for causing a cross magnetic field between said coils, an armature mounted within said cross field, a flux distributing member comprising a plate of magnetic material having arms capable of being bent to lie adjacent the vertical planes of the coils, one of said arms being bendable to enable its free end to be adjusted radially and laterally for calibrating the instrument.

In testimony whereof I have affixed my signature to this specification.

MOSES E. CHENEY.